(12) United States Patent
Witz et al.

(10) Patent No.: US 8,241,718 B2
(45) Date of Patent: *Aug. 14, 2012

(54) PREFORM AND A MOLD STACK FOR PRODUCING THE PREFORM

(75) Inventors: Jean-Christophe Witz, Yutz (FR); Bruce Clive Dearling, Radstock (GB); Laurent Christel Sigler, Hettange-Grande (FR)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 149 days.

This patent is subject to a terminal disclaimer.

(21) Appl. No.: 12/741,720

(22) PCT Filed: Nov. 24, 2008

(86) PCT No.: PCT/CA2008/002056
§ 371 (c)(1),
(2), (4) Date: May 6, 2010

(87) PCT Pub. No.: WO2009/076745
PCT Pub. Date: Jun. 25, 2009

(65) Prior Publication Data
US 2010/0260886 A1    Oct. 14, 2010

Related U.S. Application Data

(63) Continuation-in-part of application No. 11/956,380, filed on Dec. 14, 2007, now Pat. No. 7,897,222.

(51) Int. Cl.
*B65D 65/00* (2006.01)
*B65D 1/02* (2006.01)
*B29B 7/00* (2006.01)
*B32B 3/00* (2006.01)
*B32B 3/02* (2006.01)

(52) U.S. Cl. .................... 428/35.7; 428/34.1; 428/35.2; 428/35.5; 428/36.92; 428/542.8

(58) Field of Classification Search ............... 428/34.1, 428/34.4, 34.7, 35.2–35.5, 35.7–35.9, 36.4, 428/36.6, 36.7, 36.91, 36.92, 542.8
See application file for complete search history.

(56) References Cited

U.S. PATENT DOCUMENTS 3,387,324 A    6/1968  Valyi
(Continued)

FOREIGN PATENT DOCUMENTS
CA    2233421 C    10/1998
(Continued)

OTHER PUBLICATIONS

Concordia Development, The Smartest Way of Saving Weight, Cappello Design, Works Exclusively with Otto Hofstetter and Husky, Milano, Italy.

*Primary Examiner* — Walter B Aughenbaugh
(74) *Attorney, Agent, or Firm* — Husky Intellectual Property Services (57) ABSTRACT

There is provided a preform, and a mold stack for producing the preform. For example, there is provided a preform suitable for subsequent blow-molding. The preform includes a neck portion, a gate portion, and a body portion, extending between said neck portion, and said gate portion. The gate portion, has a conical shape. In an example embodiment, the conical shape is selected such that to homogenize angle of refraction of rays, used during a re-heating stage of a blow-molding process.

6 Claims, 11 Drawing Sheets

U.S. PATENT DOCUMENTS

| | | |
|---|---|---|
| 3,819,314 A | 6/1974 | Marcus |
| 4,243,620 A | 1/1981 | Curetti et al. |
| 4,432,530 A | 2/1984 | Marcinek |
| 4,449,913 A * | 5/1984 | Krishnakumar et al. ..... 425/548 |
| 4,915,992 A | 4/1990 | Takakusaki et al. |
| 4,927,680 A | 5/1990 | Collette et al. |
| 4,959,006 A | 9/1990 | Feddersen et al. |
| 5,008,066 A | 4/1991 | Mueller |
| 5,158,817 A | 10/1992 | Krishnakumar |
| 5,455,088 A | 10/1995 | Deemer |
| 5,714,111 A | 2/1998 | Beck et al. |
| 5,888,598 A | 3/1999 | Brewster et al. |
| 6,079,579 A | 6/2000 | De Cuyper |
| 6,248,413 B1 | 6/2001 | Barel et al. |
| 6,740,283 B2 * | 5/2004 | Matsui et al. ................. 264/509 |
| 2006/0147664 A1 | 7/2006 | Richards et al. |

FOREIGN PATENT DOCUMENTS

| | | |
|---|---|---|
| CA | 2547763 A1 | 6/2005 |
| IT | 0006443980001 D | 1/2001 |

\* cited by examiner

PREFORM AND A MOLD STACK FOR PRODUCING THE PREFORM

CROSS-REFERENCE DATA

This application is a national phase entry application of PCT Patent Application No. PCT/CA2008/002056, filed on Nov. 24, 2008, entitled "A PREFORM AND A MOLD STACK FOR PRODUCING THE PREFORM", which is a continuation-in-part of U.S. patent application Ser. No. 11/956,380, filed on Dec. 14, 2007, entitled "A PREFORM AND A MOLD STACK FOR PRODUCING THE PREFORM", now a U.S. Pat. No. 7,897,222.

FIELD OF THE INVENTION

The present invention generally relates to, but is not limited to, a molding systems and processes, and more specifically the present invention relates to, but is not limited to, a preform and a mold stack for producing the preform

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

As an illustration, injection molding of PET material involves heating the PET material (ex. PET pellets, PEN powder, PLA, etc.) to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Thereafter, the molded article can be ejected off of the core piece by use of one or more ejection structure. Ejection structures are known to assist in removing the molded articles from the core halves. Examples of the ejection structures include stripper plates, stripper rings and neck rings, ejector pins, etc.

Figure 1:
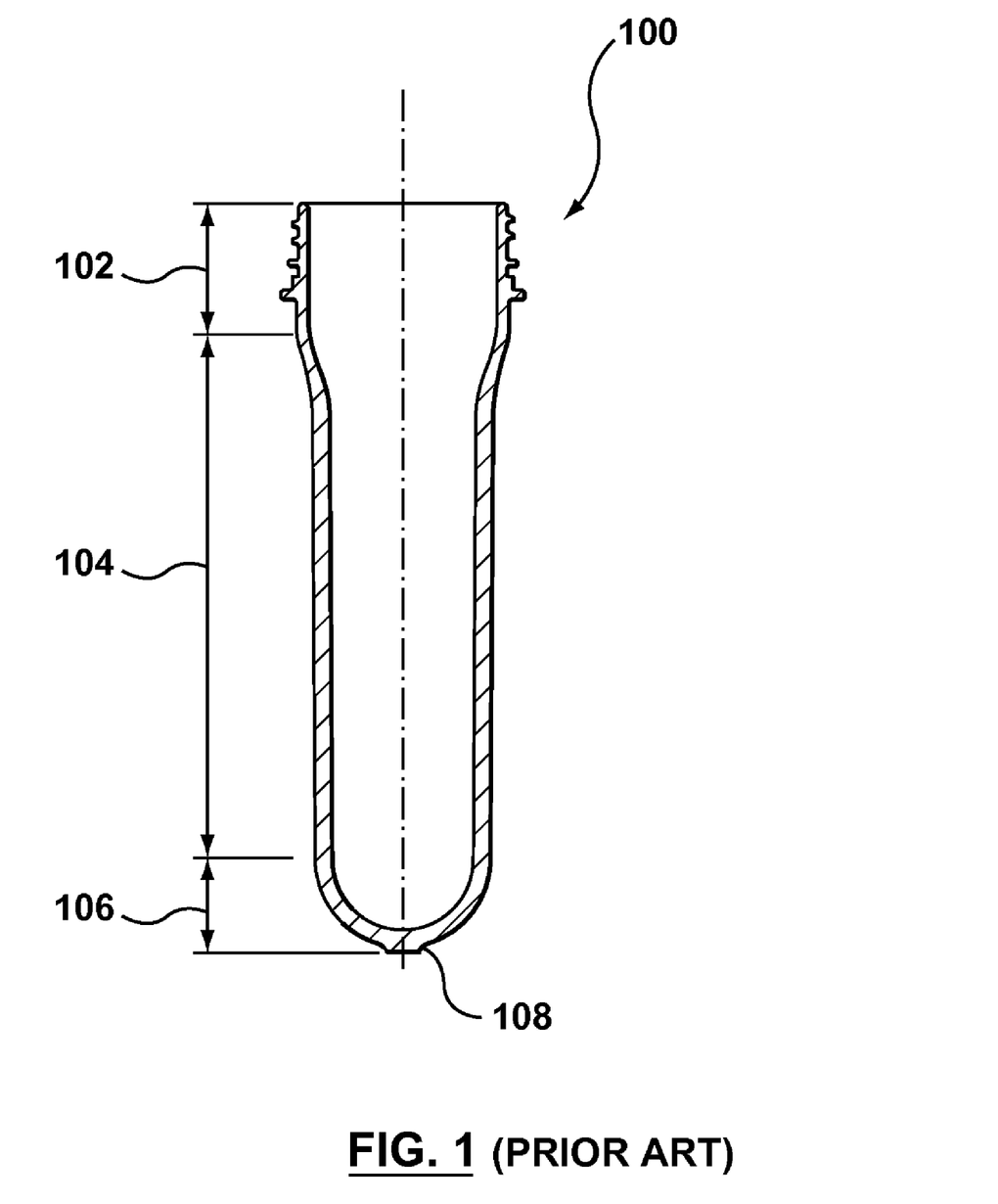
FIG. 1 depicts a cross section view of a preform 100 implemented in accordance with known techniques.

With reference to FIG. 1, a preform 100 is depicted, the preform 100 being an example of a typical prior art preform. The preform 100 consists of a neck portion 102, a gate portion 106 and a body portion 104 extending between the neck portion 102 and the gate portion 106. The gate portion 106 is associated with a substantially spherical shape that terminates in a vestige portion 108.

U.S. Pat. No. 4,432,530 issued to Marcinek on Feb. 21, 1984 discloses a mold and core rod combination for forming a plastic parison for stretch/blowing into a plastic bottle comprising a core rod with an end mated to the mold so as to permit formation of a parison with a flat on the bottom and having a sharp taper from said flat to the sidewall of the parison. The core rod is preferably shaped to include a shoulder having a substantially straight outer wall at the mouth end of the parison mold, and constructed and arranged with the mold to permit deposit of additional plastic at the inner wall of the shoulder of the parison. The design of the mated mold and core rod combination is based on the recognition that in a continuous bottle forming process a particular area of the parison can be made hotter or cooler by increasing or decreasing the thickness of that area of the parison. Parisons formed with the disclosed mold-core rod combination permit a deeper and longer stretch of the parison without tearing or deformation of the parison bottom or deformation or wrinkling at the shoulder of the finished bottle while providing essential wall strength.

U.S. Pat. No. 4,959,006 issued to Feddersen et al. on Sep. 23, 1990 discloses a mold-core rod combination for producing a plastic preform for forming blow molded plastic bottles which comprises: a neck portion defining an opening; a tubular sidewall portion depending therefrom; and an integral base structure depending from the tubular sidewall portion to a closed end; the preform having an outside wall face and an inside wall face with one of these in the base structure having integrally formed thereon a plurality of filets, extending longitudinally of the preform and defining a continuous reinforcing ring of varying thickness spaced from the closed end and circumscribing the base structure, wherein the filets decrease progressively in width and radial thickness at least from the reinforcing ring toward the closed end. The preform is capable of forming a blow molded plastic bottle with a bottom portion having a continuous reinforcing ring of circumferentially continuous radially extending alterations in wall thickness with a regularly undulating cross-section along the circumference. Preferably the filets are integral with the inside wall face.

SUMMARY OF THE INVENTION

According to a first broad aspect of the present invention, there is provided a preform suitable for subsequent blow-molding. The preform comprises a neck portion; a gate portion; and a body portion extending between the neck portion and the gate portion; the gate portion being associated with a substantially conical shape.

According to a second broad aspect of the present invention, there is provided a mold stack. The mold stack comprises a core insert for defining an internal surface of a preform; a split mold insert pair for defining an external surface of a neck portion of the preform; a cavity insert for defining the external surface of a body portion of the preform; a gate insert for defining the external surface of a gate portion of the preform; the core insert and the gate insert being configured to cooperate, in use, to define the gate portion of the preform having a first substantially conical shape.

According to a third broad aspect of the present invention, there is provided a core insert for defining, in use, a portion of a preform, the preform including a neck portion, a gate portion and a body portion extending therebetween. The core insert comprises a first cavity defining portion having a gate defining portion which has substantially conical shape, the substantially conical shape so selected such that to homogenize angle of refraction of rays used during a re-heating stage of a blow-molding process of the preform within the gate portion.

According to a fourth broad aspect of the present invention, there is provided a gate insert for defining, in use, a portion of a preform, the preform including a neck portion, a gate portion and a body portion extending therebetween. The gate insert comprises a second cavity defining portion having a substantially inverted conical shape the substantially conical cone shape so selected such that to homogenize angle of refraction of rays used during a re-heating stage of a blow-molding process of the preform within the gate portion.

According to another broad aspect of the present invention, there is provided a method of producing at least a portion of a mold stack. The method comprises selecting a shape for a gate portion of a preform suitable for blow-molding, the shape so selected as to at least substantially homogenize angle of refraction of at least some of a set of rays during re-heating stage of a blow-molding process; manufacturing the at least a portion of the mold stack to include the shape.

According to yet another broad aspect of the present invention, there is provided preform suitable for subsequent blow-molding. The preform comprises a neck portion, a gate portion; and a body portion extending between the neck portion and the gate portion; the gate portion being associated a shape so selected such that to substantially homogenize angle of refraction of rays used during a re-heating stage of a blow-molding process.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 2:
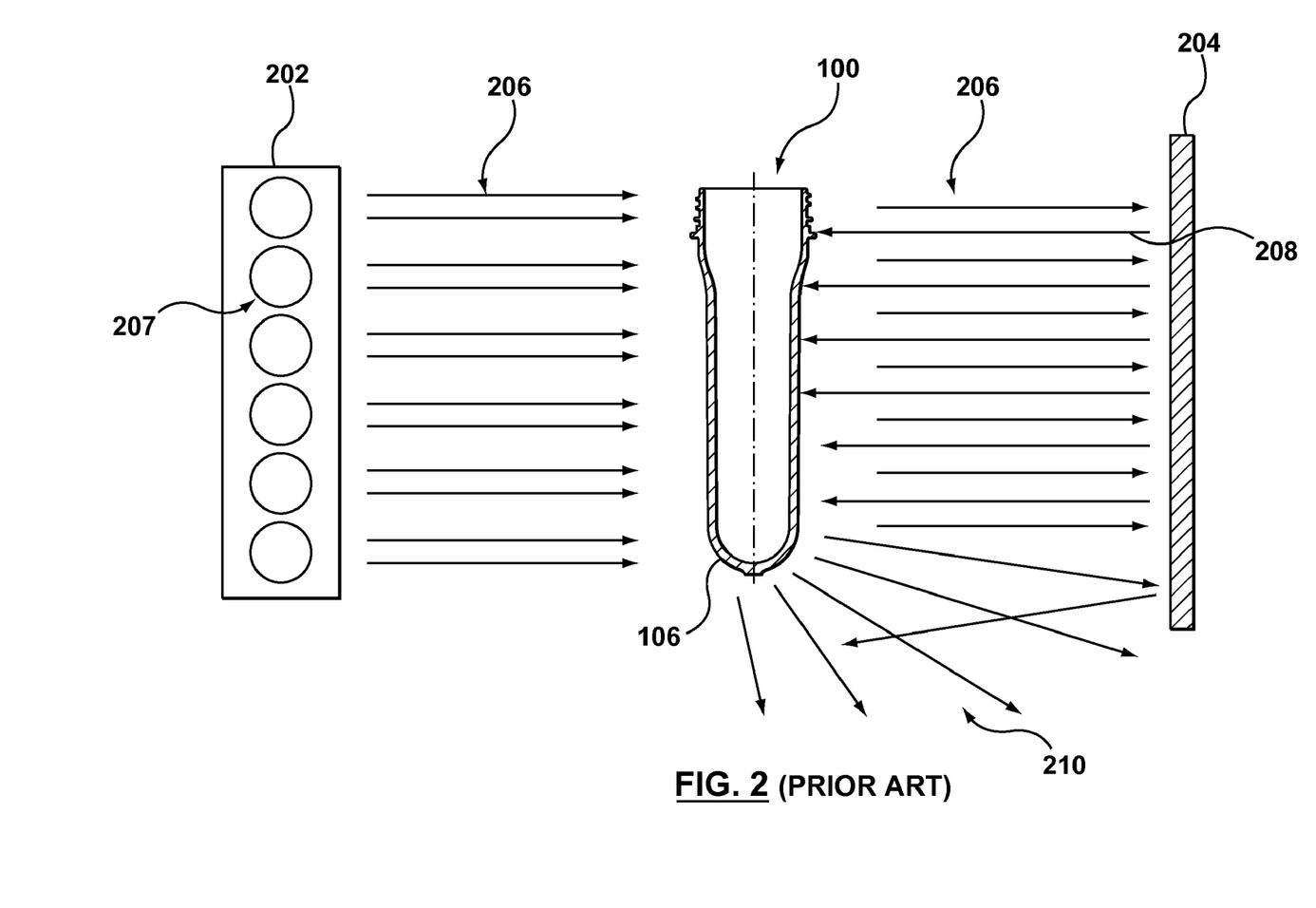
FIG. 2 schematically depicts the preform 100 of FIG. 1 during a re-heating stage of a blow-molding process, implemented in accordance with known techniques.

Inventors have appreciated that there exists a problem with known designs of preforms 100. With reference to FIG. 2, one such problem will now be illustrated in greater detail. FIG. 2 schematically illustrates the preform 100 of FIG. 1 during a re-heating stage of blow-molding process during which the preform 100 is formed into a final-shaped product. The re-heating stage is typically implemented during stretch-blow molding process, which is carried out subsequent to a molding operation to transform the preform 100 into a final-shaped article (such as a bottle and the like). The stretch-blow molding can be conveniently executed in a stretch-blow molding machine (not depicted).

Within the illustration of FIG. 2, there are provided a source of energy 202 and a reflector 204. Generally speaking, the purpose of the source of energy 202 and the reflector 204 is to re-heat the preform 100 to a required temperature, the required temperature being sufficient to re-shape the so-heated preform 100 into the final-shaped article.

The source of energy 202 comprises a plurality of emitters 203. The plurality of emitters 203 can be implemented in several variations, but within the specific non-limiting embodiment being presented herein, the plurality of emitters 203 can comprise a plurality of infrared light emitters. The plurality of emitters 203 can emit heat energy, such as for example, in a form of a set of infrared light rays 206 or the like. The set of infrared light rays 206 penetrates the preform 100 and, subsequently, gets reflected by the reflector 204 (such as, a mirror or the like), as a set of reflected infrared light rays 208. The reflector 204 is typically used to increase efficiency of the re-heating stage.

In alternative non-limiting embodiment of the present invention the plurality of emitters 203 can be configured to emit energy at frequency other than infrared. Accordingly, the set of infrared light rays 206 will be referred herein below from time to time as rays 206 to capture other alternatives for the type of energy used.

Due, at least partially, to the spherical shape of the gate portion 106 and, as the result, variable angle of refraction of the set of infrared light rays 206, which is particularly acute in the gate portion 106, a sub-set of infrared light rays 210 is created. The sub-set of infrared light rays 210 is not reflected (or is reflected at a larger angle) by the reflector 204, which significantly decreases the re-heating efficiency within the gate portion 106 and/or causes the re-heating to be uneven (i.e. variable) along the length of the gate portion 106. One common solution has been to create a subset of the plurality of emitters 203 that are located proximate to the gate portion 106, the subset of the plurality of emitters 203 being categorized by having higher power than the rest of the plurality of emitters 203. As one can appreciate, this results in additional energy consumption and additional costs, which is not entirely satisfactory from the overall operation and environmental perspectives.

Figure 3:
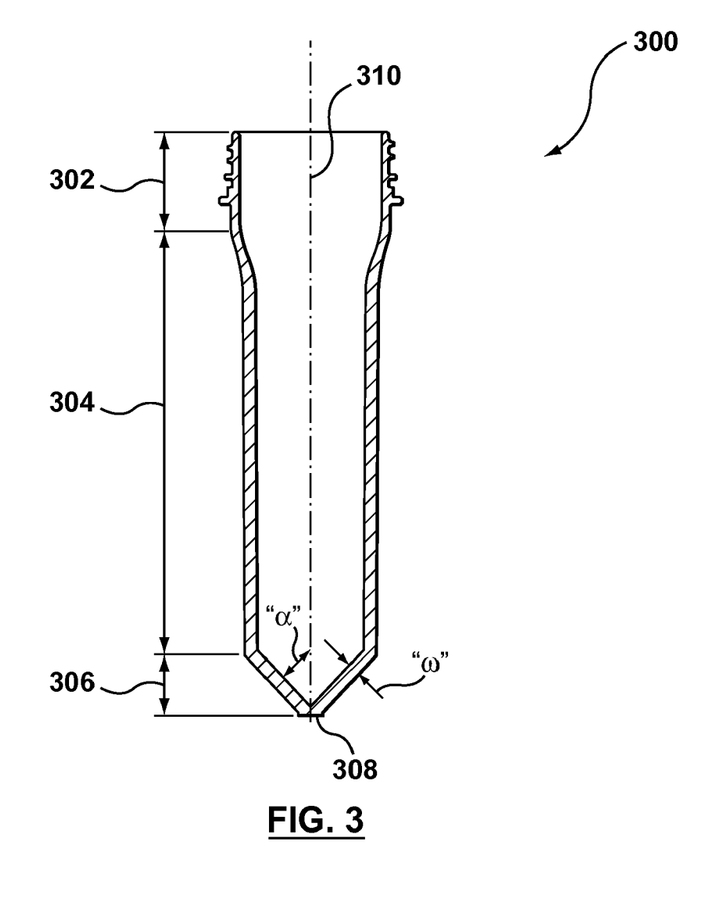
FIG. 3 depicts a cross section view of a preform 300 implemented in accordance with a non-limiting embodiment of the present invention.

Reference is now made to FIG. 3, which depicts a preform 300 implemented according to a non-limiting embodiment of the present invention. The preform 300 consists of a neck portion 302, a gate portion 306 and a body portion 304 extending between the neck portion 302 and the gate portion 306. The neck portion 302 and the body portion 304 can be implemented in a substantially similar manner to the neck portion 102 and the gate portion 106 of the preform 100 of FIG. 1.

Within these embodiments of the present invention, the gate portion 306 is associated with a substantially conical shape that terminates in a vestige portion 308. It is worthwhile noting that the vestige portion 308 delimits a lower terminal point of the conical shape of the gate portion 306. Size of the vestige portion 308 can substantially correspond to size of an orifice of a hot runner nozzle (not depicted). Within the embodiment of FIG. 3, the gate portion 306 is associated with a substantially uniform wall thickness "W", but this not need be so in every embodiment of the present invention (as will be illustrated herein below).

Within the embodiment of FIG. 3, the conical shape of the gate portion 306 is associated with an angle "α" defined between an imaginary central line 310 (the imaginary central line 310 passing through a longitudinal axis of the preform 300) and an internal surface of the conical shape of the gate portion 306. In some embodiments of the present invention, the angle "α" can be so selected as to substantially homogenize the angle of refraction along the gate portion 306 during the re-heating stage of the blow-molding process. It has been found, for example, that the substantially conical shape of the gate portion 306 leads to more homogenous angle of refraction (and, therefore, more homogenous level of absorbance and re-heating) and, generally speaking, the smaller the angle "α" selected, the better homogeneity of angle of refraction (and, therefore, re-heating) is achieved.

In alternative non-limiting embodiments of the present invention, the angle "α" can be selected further taking into account rate of filling that the angle "α" will lead to and/or amount of material that will be used based on the angle "α". As an example, the smaller the angle "α" selected, the smaller the pressure drop associated with the gate area of the molding cavity during the filling stage and, therefore, the faster the associated filling rates. By the same token, the smaller the angle "α" selected, the less material will be used to fill the gate area of the molding cavity.

Accordingly, in some embodiments of the present invention, the angle "α" can be selected taking into account some or all of (i) refraction index of a particular molding material being used, (ii) rate of filling that the angle "α" will lead to; and (iii) amount of material that will be used based on the angle "α". Accordingly, within these embodiments of the present invention, the angle "α" can be calculated as function of all or some of (i) the refraction index of the molding material, (ii) weight of the molding material to be used (i.e. stretch function of the angle "α" and the wall thickness resultant from the angle "α"), (iii) the filling rate.

For example, in case of PET, the angle "α" can be selected from a range of between, for example, approximately 10 degrees and approximately 90 degrees. In a specific non-limiting embodiment of the present invention, in case of PET, the angle "α" can be selected from a range of between, for example, approximately 37 degrees and approximately 40 degrees. In another specific non-limiting embodiment of the present invention, in case of PET, the angle "α" can be selected from a range of between, for example, approximately 40 degrees and approximately 60 degrees. In a particular specific non-limiting example, the angle "α" used can be 37 degrees. Naturally, any other angle "α" based on the refraction index of the particular molding material or any other factors discussed herein above can be used.

Figure 4:
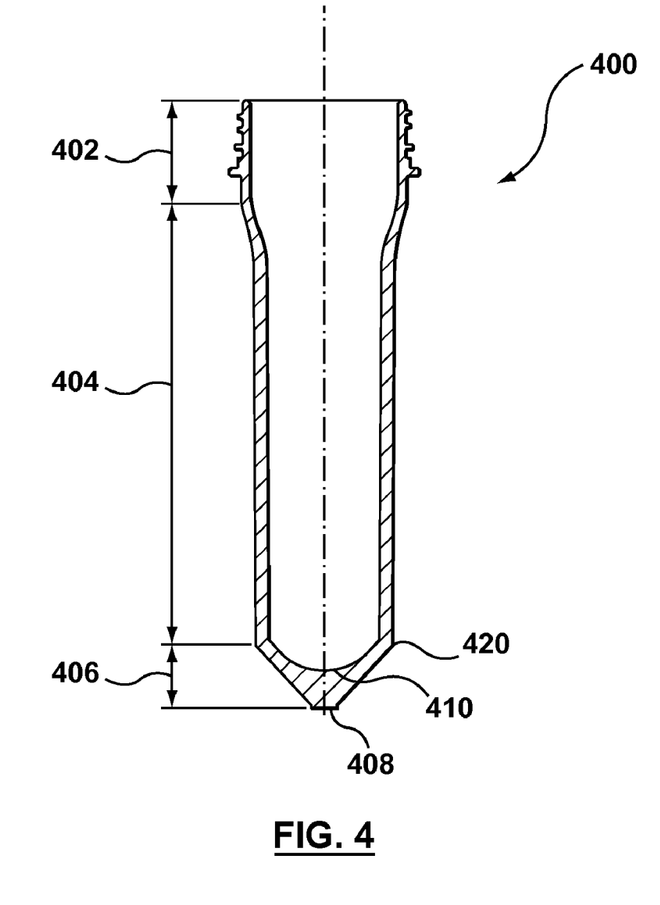
FIG. 4 depicts a cross section view of a preform 400 implemented in accordance with another non-limiting embodiment of the present invention.

Reference is now made to FIG. 4, which depicts a preform 400 implemented according to another non-limiting embodiment of the present invention. The preform 400 consists of a neck portion 402, a gate portion 406 and a body portion 404 extending between the neck portion 402 and the gate portion 406. The neck portion 402 and the body portion 404 can be implemented in a substantially similar manner to the neck portion 102 and the gate portion 106 of the preform 100 of FIG. 1.

The gate portion 406 is associated with a substantially conical shape that terminates in a vestige portion 408. It is worthwhile noting that the vestige portion 408 delimits a lower terminal point of the conical shape of the gate portion 406. Size of the vestige portion 408 substantially corresponds to size of an orifice of a hot runner nozzle (not depicted).

Within the embodiment of FIG. 4, the gate portion 406 is associated with an internal curvature section 410, which is shown in an exaggerated view in FIG. 4. It is worthwhile noting that within the embodiment of FIG. 4, the gate portion 406 is associated with a substantially non-uniform wall thickness. More specifically, wall thickness is comparatively higher around the internal curvature section 410. It is also worthwhile noting that even though the internal curvature section 410 is located on an internal surface opposite of the vestige portion 408 in the embodiment of FIG. 4, in other non-limiting embodiments of the present invention a similar curvature section can be located at other points (on the internal surface or an external surface) of the gate portion 406. An example of this alternative placement may include, but is not limited to, to a location (on the internal surface or the external surface) where the gate portion 406 meets the body portion 404, the location being depicted in FIG. 4 at 420.

Figure 11:
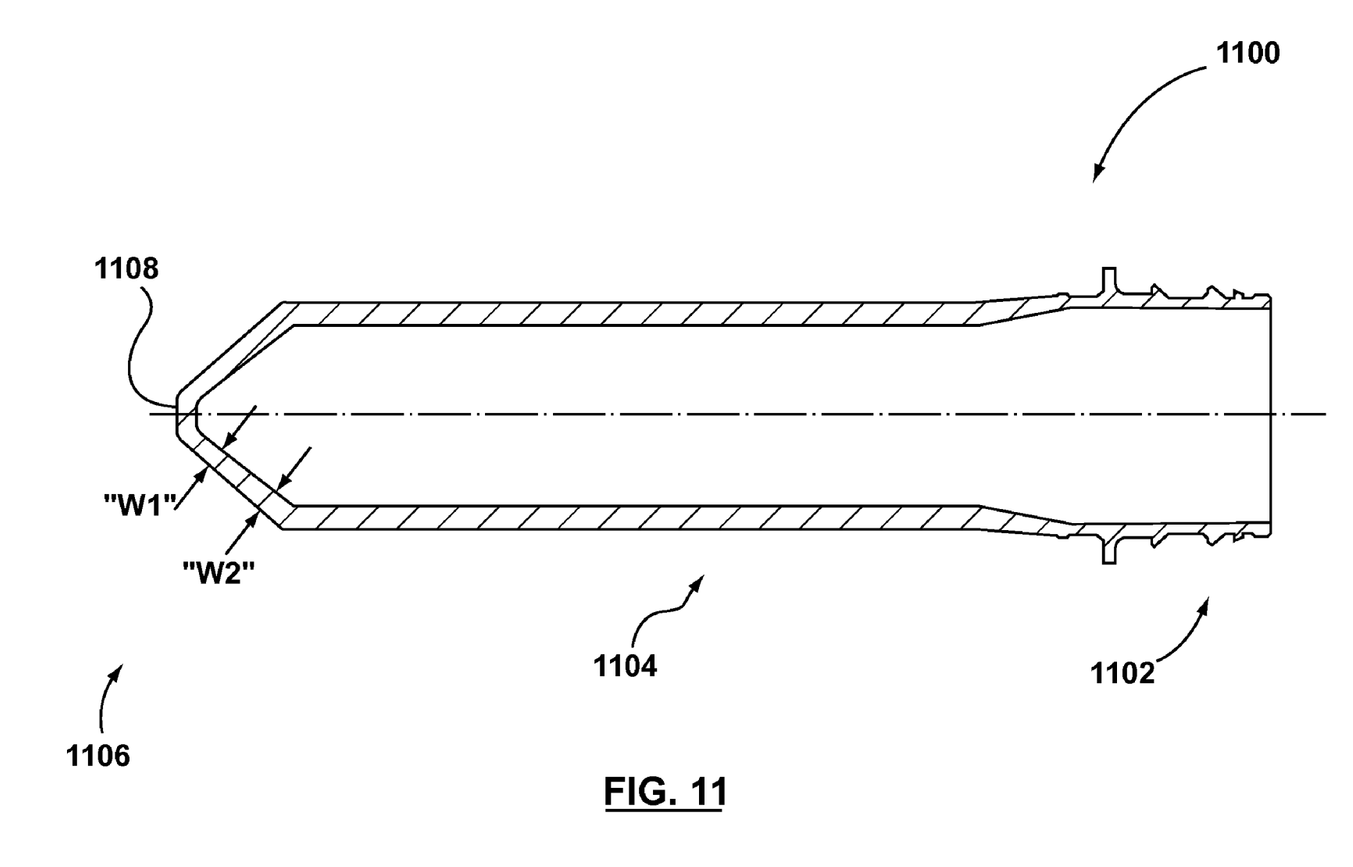
FIG. 11 depicts a cross section view of a preform 1100 implemented in accordance with another non-limiting embodiment of the present invention.

Another example of a non-uniform wall thickness implementation is depicted in FIG. 11, which shows a preform 1100 implemented in accordance with another non-limiting embodiment of the present invention. The preform 1100 consists of a neck portion 1102, a gate portion 1106 and a body portion 1104 extending between the neck portion 1102 and the gate portion 1106. The gate portion 1106 is associated with a substantially conical shape that terminates in a vestige portion 1108.

Within these embodiments of the present invention, the gate portion 1306 is associated with a substantially conical shape that terminates in the vestige portion 1108. It is worthwhile noting that the vestige portion 1108 delimits a lower terminal point of the conical shape of the gate portion 1106. Size of the vestige portion 1108 can substantially correspond to size of an orifice of a hot runner nozzle (not depicted). Within the embodiment of FIG. 11, the gate portion 1106 is associated with a wall thickness that gradually increases as it progresses from the vestige portion 1108 towards a split line (not separately numbered) defined where the gate portion 1106 meets the body portion 1104. To that extent, the gate portion 1106 can be said to be associated with a first wall thickness "W1" along a portion thereof and a second wall thickness "W2" along another portion thereof, the second wall thickness "W2" being greater than the first wall thickness "W1". More specifically, in embodiments of the present invention, the first wall thickness "W1" can be defined along a first portion of the gate portion 1106 and the second wall thickness "W2" can be defined along a second portion thereof, the second wall thickness "W2" being greater than the first wall thickness "W1" and the second portion being located closer to the split line.

A particular technical effect attributable to these embodiments of the present invention is ability to provide the most efficient filling profile, while enjoying the re-heating benefits disclosed herein. It is also noted that within certain embodiments of the present invention, provision of the vestige portion (such as the vestige portion 1108) in a size that corresponds to the size of the orifice of the hot runner nozzle (not depicted) can provide another technical effect. Namely, this arrangement results in a substantially straight profile of the conical shape of the gate portion (such as the gate portion 1106), resulting in substantially uniform angle of refraction along the length thereof (thus reducing reflection during re-heating stage) therefore, accentuating the energy savings attributable to embodiments of the present invention. Additionally and/or alternatively this arrangement with non-uniform thickness may lead to a technical advantage whereby improvements during stretch-blow molding can be enjoyed, for example due to differentiated stretch ratios and/or locating additional material where required (for example, where "feet" of a petaloid bottle produced from the preform 1100 for example, are to be located and the like).

Figure 6:
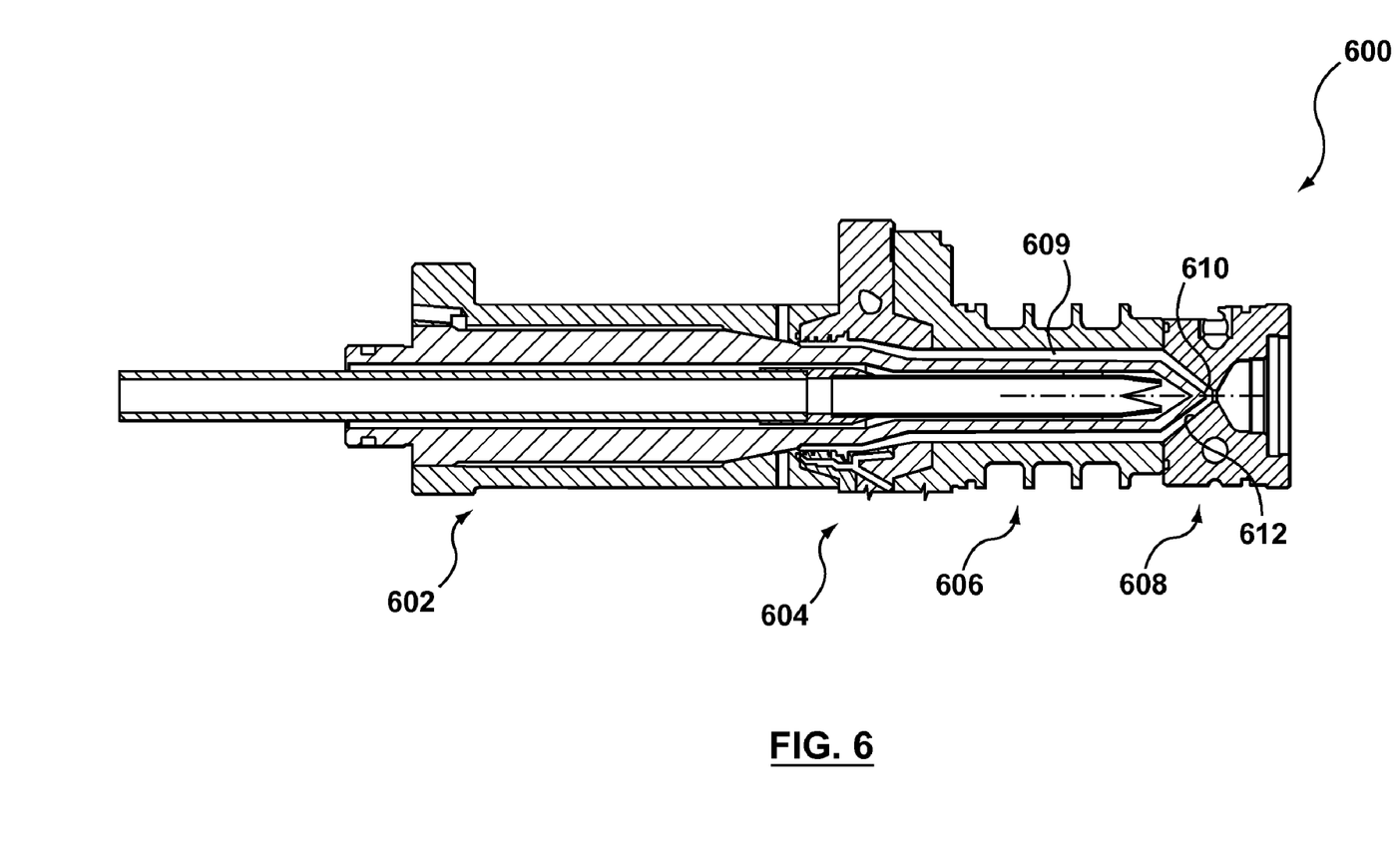
FIG. 6 depicts a cross-section view of a mold stack 600 configured to produce the preform 300 of FIG. 3, implemented according to a non-limiting embodiment of the present invention.

With reference to FIG. 6, there is depicted a mold stack 600 implemented according to a non-limiting embodiment of the present invention. Within the illustration being presented herein, the mold stack 600 is configured to produce the preform 300 of FIG. 3. It is, however, expected that suitable modifications can be made by those of ordinary skill in the art to the mold stack 600 to produce the preform 400 of FIG. 4.

The mold stack 600 comprises a core insert 602, a split mold insert pair 604, a cavity insert 606 and a gate insert 608. In use, the core insert 602, the split mold insert pair 604, the cavity insert 606 and the gate insert 608 define a molding cavity 609, into which molding material (such as plasticized PET or other suitable molding material) can be injected to form the preform 300.

Figure 7:
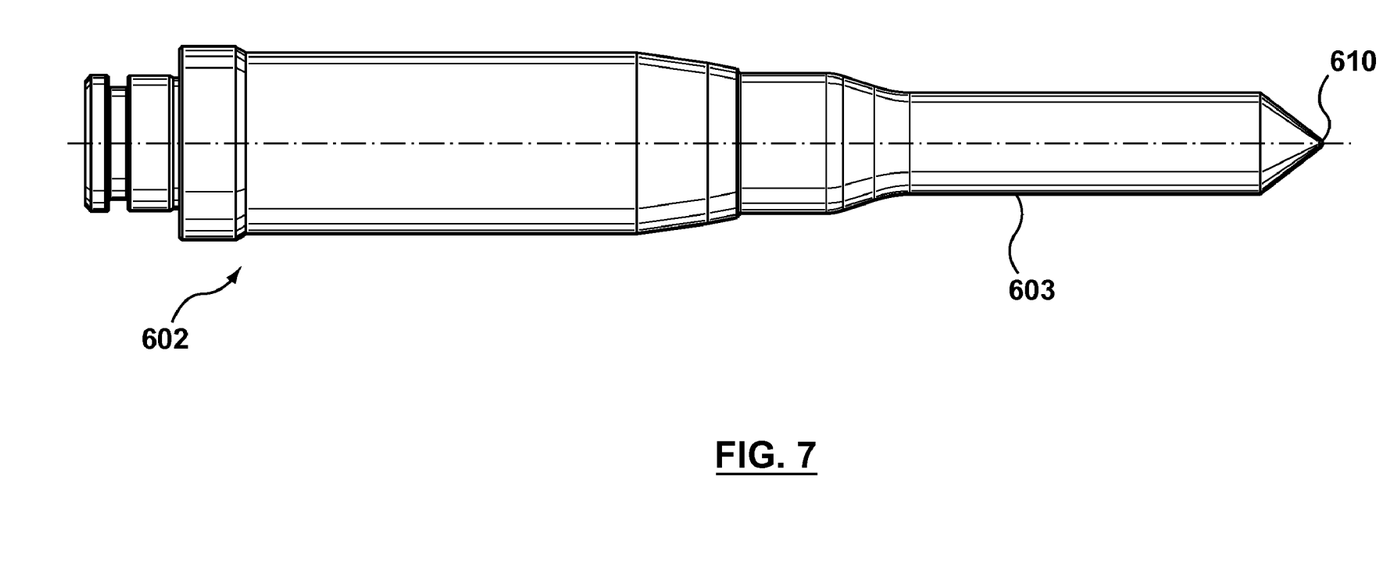
FIG. 7 is a side view of a core insert 602 of the mold stack 600 of FIG. 6, implemented according to a non-limiting embodiment of the present invention.

With continued reference to FIG. 6 and with brief reference to FIG. 7, the core insert 602 is configured to define, in use, an internal surface of the preform 300. To that extent, the core insert 602 comprises a first cavity defining portion 603 configured to define a portion of the molding cavity 609 and an attachment portion 601 configured for attachment to a core plate (not depicted). In the embodiment depicted herein, the attachment portion 601 can be further configured to define a portion of the molding cavity 609. In some embodiments of the present invention, the attachment portion 601 can be implemented as a lock ring. It should be noted that even though within the specific non-limiting embodiment being depicted herein, the first cavity defining portion 603 and the attachment portion 601 are implemented as structurally separate elements, in alternative non-limiting embodiments of the present invention, they can be implemented differently. For example, in alternative non-limiting embodiments of the present invention, the core insert 602 can be implemented without the lock ring and the like.

The first cavity defining portion 603 comprises a gate defining portion 610. More specifically, the gate defining portion 610 has a substantially conical shape. Within some embodiments of the present invention, the gate defining portion 610 can be machined. However, in alternative non-limiting embodiments, other standard manufacturing methods can be used, such as cutting operation, milling operation or grinding operation.

With continued reference to FIG. 6, the split mold insert pair 604 is configured to define, in use, a portion of an external surface of the preform 300 and, more specifically, a portion of an external surface of the neck portion 302 of the preform 300. The cavity insert 606 is configured to define, in use, a portion of an external surface of the preform 300 and, more specifically, a portion of an external surface of the body portion 304 of the preform 300.

Figure 8:
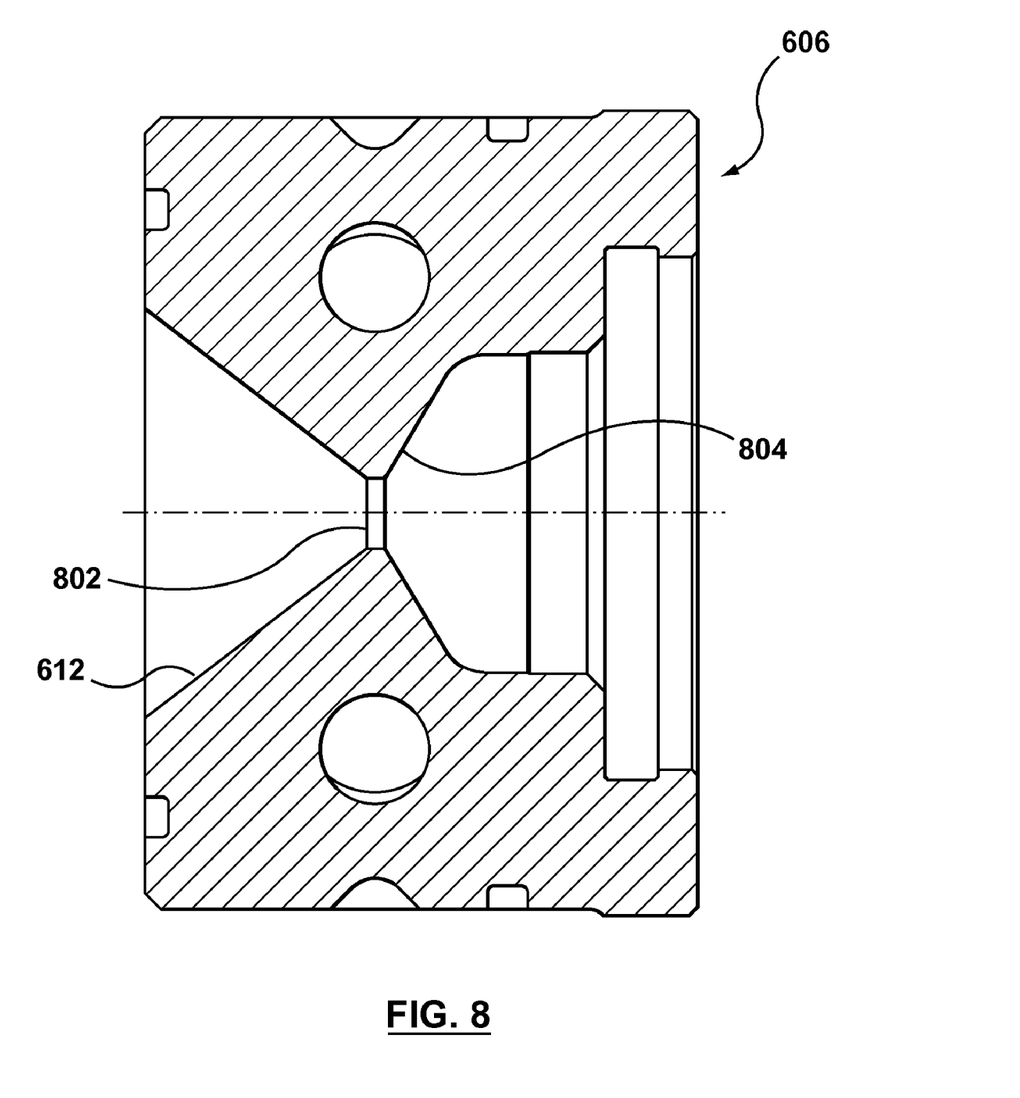
FIG. 8 is a cross-section view of a gate insert 608 of the mold stack 600 of FIG. 6, implemented according to a non-limiting embodiment of the present invention.

With continued reference to FIG. 6 and with brief reference to FIG. 8, the gate insert 608 is configured to define, in use, a portion of an external surface of the preform 300. To that extent, the gate insert 608 comprises a second cavity defining portion 612 configured to define a portion of an external surface of the gate portion 306 of the preform 300. Shape of the second cavity defining portion 612 generally corresponds to the above-described gate portion 306. More specifically, the second cavity defining portion 612 is associated with an inverted conical shape.

Within some embodiments of the present invention, the second cavity defining portion 612 can be machined. However, in alternative non-limiting embodiments, other manufacturing methods can be used, such as but not limited to standard drilling tools, grilling operation and the like.

The inverted conical shape of the second cavity defining portion 612 terminates in an extremity 802, which substantially corresponds in diameter to an orifice (not separately numbered) of a nozzle receptacle 804 of the gate insert 608 (the nozzle receptacle 804 being configured to receive, in use, a hot runner nozzle (not depicted), which is omitted from the illustration for the sake of simplicity).

Figure 9:
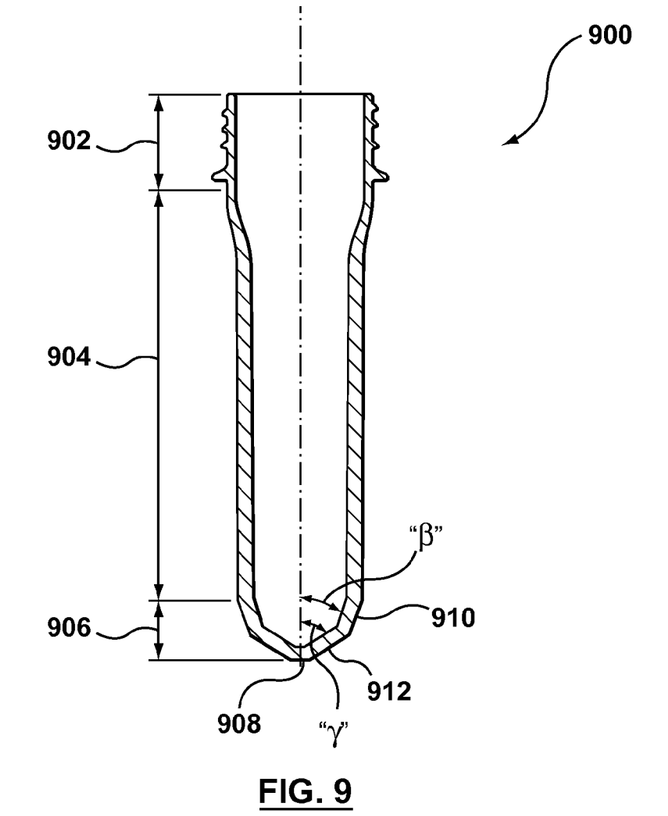
FIG. 9 depicts a cross section view of a preform 900 implemented in accordance with yet another non-limiting embodiment of the present invention.

With reference to FIG. 9, a preform 900 implemented in accordance with another non-limiting embodiment of the present invention is depicted. The preform 900 consists of a neck portion 902, a gate portion 906 and a body portion 904 extending between the neck portion 902 and the gate portion 906. The neck portion 902 and the body portion 904 can be implemented in a substantially similar manner to the neck portion 102 and the gate portion 106 of the preform 100 of FIG. 1.

The gate portion 906 is associated with a substantially conical shape that terminates in a vestige portion 908. Within the embodiment of FIG. 9, the conical shape of the gate portion 906 comprises a first cone 910 and a second cone 912. Within these embodiments of the present invention, the first cone 910 is associated with a first angle "β" and the second cone 912 is associated with a second angle "γ", the second angle "γ" being larger that the first angle "β".

It is worthwhile noting that the vestige portion 908 delimits a lower terminal point of the second cone 912 (as well, as the overall conical shape of the gate portion 906). Size of the vestige portion 908 substantially corresponds to size of an orifice of a hot runner nozzle (not depicted).

Figure 10:
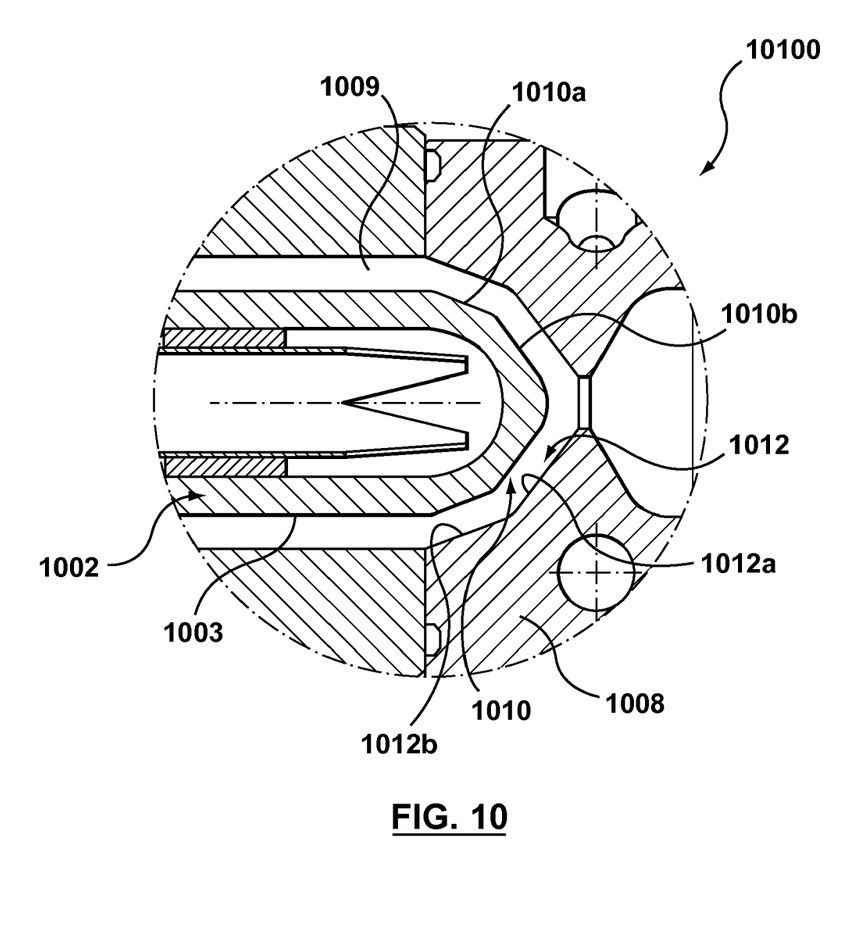
FIG. 10 depicts a cross-section view of a portion of a mold stack 1000 configured to produce the preform 900 of FIG. 9, implemented according to a non-limiting embodiment of the present invention.

With reference to FIG. 10, there is depicted a portion of a mold stack 1000 implemented according to a non-limiting embodiment of the present invention. Within the illustration being presented herein, the mold stack 1000 is configured to produce the preform 900 of FIG. 9. The mold stack 1000 can be substantially similar to the mold stack 600, but for the specific differences discussed herein below.

Specifically, the mold stack 1000 comprises inter alia a core insert 1002 and a gate insert 1008. The core insert 1002 is configured to define, in use, an internal surface of the preform 900. To that extent, the core insert 1002 comprises a first cavity defining portion 1003 configured to define a portion of a molding cavity 1009. The first cavity defining portion 1003 comprises a gate defining portion 1010. The gate defining portion 1010 comprises a first cone portion 1010*a* and a second cone portion 1010*b*.

The gate insert 1008 is configured to define, in use, a portion of an external surface of the preform 900. To that extent, the gate insert 1008 comprises a second cavity defining portion 1012. The second cavity defining portion 1012 comprises a first cone segment 1012a and a second cone segment 1012b. In use, the first cone portion 1010a and the second cone segment 1012b cooperate to define the aforementioned first cone 910. Similarly, the second cone portion 1010b and the first cone segment 1012a cooperate, in use, to define the aforementioned second cone 912.

It should be noted that even though FIG. 9 and FIG. 10 depict the preform 900 and the mold stack 1000 for producing the preform 900, the preform 900 having the gate portion 906 comprised of the first cone 910 and the second cone 912, in alternative embodiments of the present invention, the gate portion 906 can be comprised of two or more cones.

Accordingly, according to embodiments of the present invention, there is provided the mold stack 600, 1000 and, more specifically, the core insert 602, 1002 and the gate insert 608, 1008 configured to produce the preform 300, 400, 900 that substantially homogenizes angle of refraction of at least some of the set of infrared light rays 206 during the re-heating stage of the blow-molding process and/or minimizes amount of material used to fill at least a portion of the preform 300, 400, 900 and/or increases the fill rate.

According to embodiments of the present invention, there is also provided a method for producing at least a portion of the mold stack 600, 1000. More specifically, there is provided a method for producing one or both of the core insert 602, 1002 and the gate insert 608, 1008. The method includes:

Selecting a shape for the gate portion 306, 406, 906 to be produced, the shape of the gate portion 306, 406, 906 so selected as to at least substantially homogenize angle of refraction of at least some of the set of infrared light rays 206 used during re-heating stage of the blow-molding process and, consequently, efficiency of re-heating. In some embodiments of the present invention, the selecting step additionally or alternatively includes, additionally, selecting the shape which also reduces weight of the molding material used and/or improves fill rates. In some embodiments of the present invention, the so-selected shape comprises a cone shape or a shape comprised of one or more cones.

Once the shape is selected, the method further includes manufacturing one or both of the core insert 602, 1002 and the gate insert 608, 1008. Manufacturing can be implemented by using known techniques, such as a Computer Numerically Controlled (CNC) machining and the like.

Even though embodiments of the present invention have been described herein above using the cavity insert 606 and the gate insert 608 implemented as structurally separate members, in alternative non-limiting embodiments of the present invention, the cavity insert 606 and the gate insert 608 can be implemented as a structurally integral insert. Similarly, even though the preform 300, 400, 900 has been described as one suitable for stretch-blow molding; in alternative non-limiting embodiments of the present invention, the preform 300, 400, 900 can be subjected to other types of blowing processes. Furthermore, even though certain portions of the mold stack 600, 1000 have been described as inserts, in alternative embodiments of the present invention, these components can be implemented as structurally integral components of the mold plates and, accordingly, within the instant description the term "insert" is meant to include structurally integral components of the mold plates.

Operation of the mold stack 600 of FIG. 6 can be implemented in a substantially similar manner to operation of the prior art mold stacks (not depicted) and, accordingly, only a brief description of the operation of the mold stack 600 will be presented herein. It is expected that those of ordinary skill in the art will be able to adapt these teachings for operation of the mold stack 1000 of FIG. 10. In FIG. 6, the mold stack 600 is shown in a mold closed position, within which it can be maintained by cooperating platens (ex. a moveable and a fixed platens) under tonnage applied by suitable means (such as, hydraulic, electric means and the like).

Within the mold closed configuration, molding material can be injected into the molding cavity 609 from a hot runner nozzle (not depicted) received within the nozzle receptacle 804. How the molding material is distributed between an injection unit (not depicted) and the hot runner nozzle (not depicted) can be implemented in a conventional manner. The so-injected molding material is then solidified by means of, for example, coolant being circulated in or around the cavity insert 606, and/or in or around the gate insert 608, and/or in or around the split mold insert pair 604 and/or within the core insert 602.

The mold stack 600 is then actuated into a mold-open position where the preform 300, 400, 900 can be de-molded from within the molding cavity 609. Typically, when the mold stack 600 begins to open, the preform 300, 400, 900 stays on the core insert 602. The split mold insert pair 604 is activated in a lateral direction (by any suitable means, such as cams, servo motors, etc.) to provide clearance for the neck portion 302, 402, 902). Movement of the split mold insert pair 604 in an operational direction causes the preform 200, 400, 900 to be removed from the core insert 602. At this point, the mold stack 600 can be actuated into the mold closed condition and a new molding cycle can commence.

Even though embodiments of the present invention have been described with reference to injection molding and the mold stack 600, 1000 suitable for injection molding, this need not be so in every embodiment of the present invention. Accordingly, it is expected that teachings of the present invention can be adapted to other types of molding operations, such as extrusion molding, compression molding, compression injection molding and the like.

A technical effect of embodiments of the present invention may include provision of the preform 300, 400, 900 which substantially homogenizes angle of refraction of at least some of the set of infrared light rays 206 during re-heating stage of the blow-molding process within the gate portion 306, 406, 906. This, in turn, may lead to increased re-heating efficiency of the gate portion 306, 406, 906 of the preform 300, 400, 900 at least partially due to more constant absorbance of the set of infrared light rays 206, which can be attributed at least partially to more homogenous angle of refraction along the length of the gate insert 608, 1008 and/or decreased level of reflection. Another technical effect of embodiments of the present invention may include provision of the preform 300, 400, 900 which requires less material compared to the preform 100. This, in turn, may lead to cost savings associated with savings associated with raw materials. Another technical effect of embodiments of the present invention may includes provision of the mold stack 600 for producing the preform 300, 400, 900; the mold stack 600 providing less of a pressure drop within a portion of the molding cavity 609, 1009 that defines the gate portion 306, 406, 906 of the preform 300, 400, 900. This, in turn, may result in a faster fill process. It should be expressly understood that not all of the technical effects need to be realized in each and every embodiment of the present invention.

Figure 5:
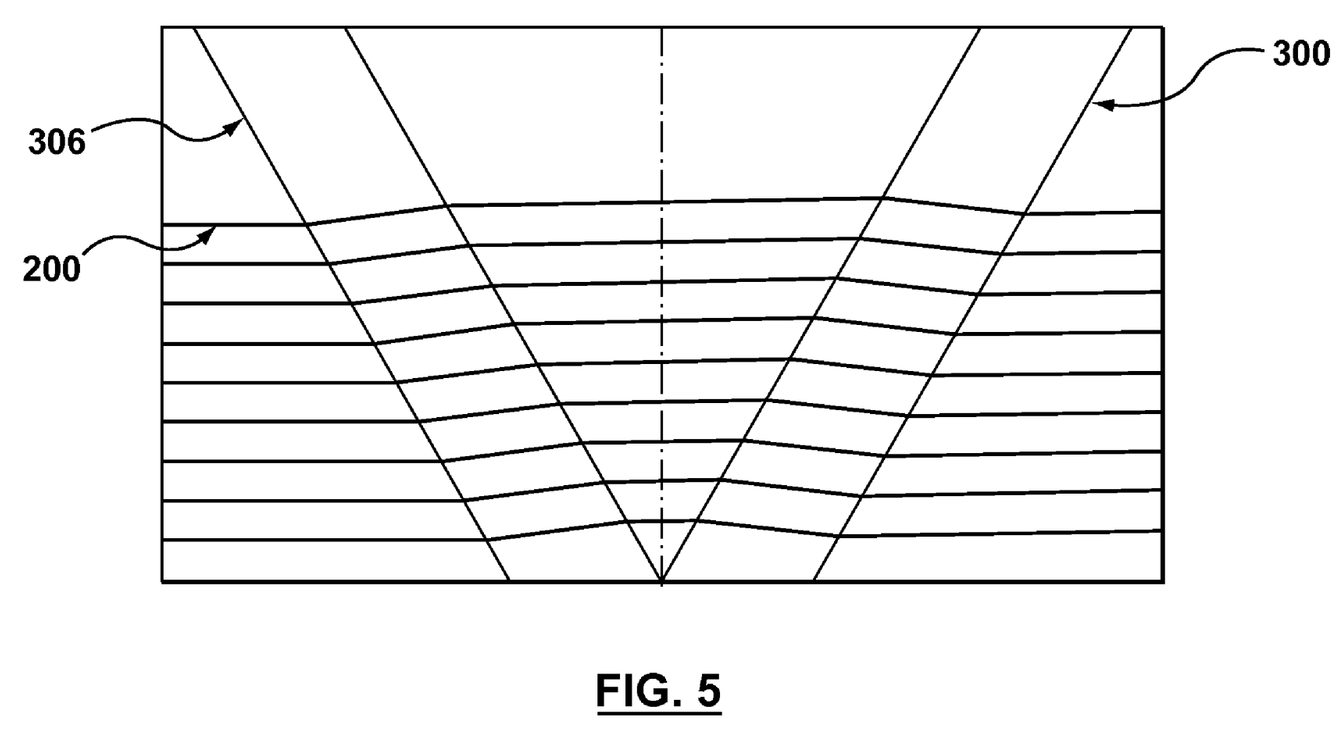
FIG. 5 schematically depicts a portion of the preform 300 during the re-heating stage of the blow-molding process, similar to that of FIG. 2.

A particular technical effect associated with the increased re-heating efficiency of some of the embodiments of the present invention is best illustrated with reference to FIG. 5, which depicts a portion of the preform 300 of FIG. 3 during the re-heating stage of the blow molding process. More specifically, a portion of the gate portion 306 is depicted. The source of energy 202 and the reflector 204 have been omitted from the illustration of FIG. 5 for the sake of simplicity. As is clearly shown in FIG. 5, angle of refraction in the gate portion 306 is significantly homogenized and substantially no sub-set of rays (similar to the sub-set of infrared light rays 210) and, as such, re-heating efficiency is substantially maintained or improved in the gate portion 306. Accordingly, a final-shaped article (not depicted) that is produced (for example, by means of blow-molding) from the preform 300, 400, 900 can be said to have a stretched gate area that suffers from less internal stress due, at least partially, to better re-heating efficiency.

Accordingly, it can be said that the preform 300, 400, 900 implemented in accordance with embodiments of the present invention, is associated with a shape that substantially homogenizes angle of refraction of at least some of the set of infrared light rays 206 (or other types of rays) around the gate portion 306, 406, 906 during the re-heating stage of the stretch-blow molding process.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/ or functions, and may be further extended to a variety of other applications that are within the scope of the present invention. Having thus described the non-limiting embodiments of the present invention, it will be apparent that modifications and enhancements are possible without departing from the concepts as described.

Therefore, what is to be protected by way of Letters Patent are limited only by the scope of the following claims:

What is claimed is:

1. A preform suitable for subsequent blow-molding comprising:
    a neck portion;
    a gate portion; and
    a body portion extending between said neck portion and said gate portion;
    the gate portion having a conical shape,
    wherein the conical shape terminates directly in a vestige portion having a size that corresponds to the size of an orifice of a hot runner nozzle used for manufacturing the preform; and wherein the conical shape has a straight profile, whereby the angle of refraction of rays used during a re-heating stage of a blow-molding process is homogenized.

2. The preform of claim 1, wherein the gate portion comprises an even wall thickness.

3. The preform of claim 1, wherein the conical shape has an angle defined between an imaginary central line and an internal surface of the conical shape.

4. The preform of claim 3, wherein said angle has been selected as a function of and depends on a refraction index of a material being used for forming the preform such that to homogenize angle of refraction of rays used during a re-heating stage of a blow-molding process.

5. The preform of claim 3, wherein said angle has been selected as a function of and depends on at least one of: (i) a refraction index of a material being used for forming the preform, (ii) a fill speed; and (iii) weight of material to be used such that to homogenize angle of refraction of rays used during a re-heating stage of a blow-molding process.

6. A preform suitable for subsequent blow-molding comprising:
    a neck portion;
    a gate portion; and
    a body portion extending between said neck portion and said gate portion;
    the gate portion having a conical shape,
    wherein the conical shape terminates directly in a vestige portion that has a size that corresponds to the size of an orifice of a hot runner nozzle used for manufacturing the preform and wherein the conical shape has a straight profile.

* * * * *